US010027620B2

(12) United States Patent
Hillier et al.

(10) Patent No.: US 10,027,620 B2
(45) Date of Patent: Jul. 17, 2018

(54) CALL PROCESSING TELECOMMUNICATION SYSTEM AND METHODS THEREOF IN A WIFI NETWORK

(75) Inventors: Peter Matthew Hillier, Ottawa (CA); Katayoun Hillier, Ottawa (CA)

(73) Assignee: Mitel Networks Corporation, Ontario, Ottawa (CA)

( * ) Notice: Subject to any disclaimer, the term of this patent is extended or adjusted under 35 U.S.C. 154(b) by 495 days.

(21) Appl. No.: 12/930,450

(22) Filed: Jan. 7, 2011

(65) Prior Publication Data
US 2012/0177029 A1    Jul. 12, 2012

(51) Int. Cl.
| | |
|---|---|
| H04L 12/66 | (2006.01) |
| H04L 29/12 | (2006.01) |
| H04L 29/06 | (2006.01) |
| H04M 3/42 | (2006.01) |
| H04M 7/00 | (2006.01) |

(52) U.S. Cl.
CPC ........ *H04L 61/106* (2013.01); *H04L 65/1053* (2013.01); *H04L 65/1069* (2013.01); *H04L 65/1073* (2013.01); *H04M 3/42229* (2013.01); *H04M 7/0075* (2013.01)

(58) Field of Classification Search
CPC ........... H04L 29/06027; H04L 65/1069; H04L 65/1006; H04L 12/6418; H04L 12/66; H04L 65/1083; H04L 65/103; H04L 67/14; H04W 80/04
USPC .................................................. 370/352–356
See application file for complete search history.

(56) References Cited

U.S. PATENT DOCUMENTS

| | | | |
|---|---|---|---|
| 2006/0159073 A1* | 7/2006 | Chun ........................... | 370/352 |
| 2007/0121602 A1* | 5/2007 | Sin et al. .................... | 370/356 |
| 2008/0043967 A1* | 2/2008 | Chen et al. ............. | 379/211.01 |
| 2008/0056235 A1* | 3/2008 | Albina et al. ................ | 370/352 |
| 2008/0130623 A1* | 6/2008 | Skog et al. .................. | 370/349 |
| 2008/0304631 A1* | 12/2008 | Vilis et al. ....................... | 379/45 |
| 2009/0028063 A1* | 1/2009 | Chang et al. ................ | 370/252 |

(Continued)

FOREIGN PATENT DOCUMENTS

WO    WO 2004/082219 A2    9/2004

OTHER PUBLICATIONS

Siemens Enterprise Communications: "Information—OpenScape MobileConnect" May 1, 2010, pp. 1-6, XP55011050—retrieved from Internet—ipbx.com.au/getmedia/a659382f-65bf-4012 . . . .

(Continued)

*Primary Examiner* — Wutchung Chu
*Assistant Examiner* — Najeebuddin Ansari

(57) ABSTRACT

Global identifiers can be dialed from anywhere in the world. The present application relates to a call processing telecommunication system and methods thereof in a wireless network for connecting communication devices. The integrated system can resolve issues with global identification using internal identifiers. In one illustrative embodiment, the global identifiers can be registered and mapped to an internal number such that the global numbers can be used to contact individuals. When a call is placed by a communication device, the internal identifier of the calling device can be tied back to the global identifier, which then provides access to the IP address of the VoIP client to complete the call. For incoming calls, the global identifiers can be translated into an internal identifier to route the call through the network.

11 Claims, 5 Drawing Sheets

(56) References Cited

U.S. PATENT DOCUMENTS

| | | | |
|---|---|---|---|
| 2009/0131045 A1* | 5/2009 | Feuer et al. | 455/426.1 |
| 2009/0225744 A1* | 9/2009 | Zerillo | 370/352 |
| 2009/0310570 A1* | 12/2009 | Smith | 370/335 |
| 2010/0014507 A1* | 1/2010 | Linkola et al. | 370/352 |
| 2010/0150337 A1* | 6/2010 | Chen | H04M 3/42272 379/265.02 |
| 2010/0157986 A1* | 6/2010 | Rao et al. | 370/352 |
| 2010/0226346 A1* | 9/2010 | Caldwell et al. | 370/338 |
| 2011/0130167 A1* | 6/2011 | Parlamas et al. | 455/552.1 |

OTHER PUBLICATIONS

Anonymous: "BlackBerry Mobile Voice System—BlackBerry MVS Client" Jul. 27, 2010, pp. 1-15, XP55026548—retrieved from Interinet—docs.blackberry.com/en/smartphone_users/deliverables.
Anonymous: "Durchwahl—Wikipedia Article" Sep. 7, 2010, p. 1, WX55026541—retrieved from Internet:de.wikipedia.org/w/index.php?title=Durchwahl [with English translation].

* cited by examiner

CALL PROCESSING TELECOMMUNICATION SYSTEM AND METHODS THEREOF IN A WIFI NETWORK

TECHNICAL FIELD

This application generally relates to telecommunications, and more particularly, to an integrated system and methods thereof for connecting devices in a wireless network.

BACKGROUND

Attention recently has been directed to implementing voice telephone services over the worldwide network commonly known as the Internet. WiFi calling is a new concept that allows cellular phones to operate a VoIP client to communicate with telephony switching equipment, thus allowing tolls to be bypassed. WiFi cellular telephones can automatically switch between conventional cellular and WiFi VoIP modes, even during the course of a conversation. With a WiFi cellular phone set, if a building has WiFi access, the call is handed off from the conventional cellular network to the WiFi LAN, taking advantage of VoIP technology to maintain the call without drop-out.

VoIP clients can be configured today with PBX extensions. Provided the destination extension is known, it can be dialed from the cell phone e.g. four digit extension dialing or PSTN breakout. Likewise, a device can receive calls if it is registered with the PBX, and the caller knows the extension number of the VoIP client. In these cases, tolls are also avoided. PBX extensions only have meaning within a PBX network. A drawback of this approach is that the VoIP client must be programmed as an extension on the PBX, and others must know the extension number in order to call the device.

VoIP clients can be reached by an IP address, the IP address having global scope, or internal scope defined by the network, which is similar to a PBX extension being valid only within the scope of the PBX. Today, VoIP clients can operate via a service provider, or point-to-point. Both models require a unique identifier, such as a number, to be mapped to an IP address. In the case of a service provider, the identifier is unique within the domain of the provider, a prerequisite so that communications can be routed through the service provider network. In the case of point-to-point protocols, the unique identifier is resolved directly by the calling device to obtain the destination IP address, and does not require a service provider to resolve the identifier and handle the routing.

Bridging a mobile to VoIP number can be accomplished via E.164 Number Mapping (ENUM) standard services, but requires that the carriers consult with the ENUM service. ENUM services have preference to WiFi over mobile, which is not cost beneficial to carriers and mobile operators. It also requires configuration, often static, to work correctly. A feature such as Force to PBX can also be used to force all calls to the cellular device via the PBX, but this often requires static configuration at the carrier, and does not provide a solution for toll bypass of calls originating from the cellular device.

Existing service providers, such as Skype® or Gizmo®, offer a new number, which then represents a VoIP application or subset of existing numbers. The application is provided by the service provider, and is used to register and access the service provider network. Calls are often limited to other members within the network or break out charges apply if the service provider must route the call via the public switched telephone network. The present application addresses the above-described issues encountered in WiFi calling by describing a model that allows a cellular device to make and receive calls over WiFi using its global number. This along with other related advantages are described herein.

BRIEF DESCRIPTION OF DRAWINGS

The novel features believed to be characteristic of the application are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The application itself, however, as well as a preferred mode of use, further objectives and advantages thereof, will be best understood by reference to the following detailed description of illustrative embodiments when read in conjunction with the accompanying drawings, wherein:

DESCRIPTION OF THE APPLICATION

The description set forth below in connection with the appended drawings is intended as a description of presently preferred embodiments of the application and is not intended to represent the only forms in which the present application can be constructed and/or utilized. The description sets forth the functions and the sequence of steps for constructing and operating the application in connection with the illustrated embodiments. It is to be understood, however, that the same or equivalent functions and sequences can be accomplished by different embodiments that are also intended to be encompassed within the spirit and scope of this application.

Global identifiers can be dialed from anywhere in the world. The present application relates to a call processing telecommunication system and methods thereof in a wireless network for connecting communication devices. The integrated system can route calls to global numbers within a local network, thus reducing or eliminating costs. This is achieved by associating the phone to the local network and mapping the global identifiers to local network identifiers. In one illustrative embodiment, the global identifiers can be registered and mapped to an internal number such that the global numbers can be used to contact individuals. When a call is placed by a communication device, the local network can be utilized, and the dialed number, i.e. global identifier, can be checked to determine if it is within scope of the local network. If it is not, the local network can route the call to the global network. The phone exchange can route the call out to the public switched telephone network so that the calling device can still be using VoIP and not the cellular network.

When the global number is within scope, the system ties the dialed global number to the internal identifier of the called device, allowing the call to be routed through the local network. This is typically performed through PBX extensions. At the egress point, the local identifier is translated to the IP address of the VoIP client in order to complete the call to the device. In a single PBX system, the system would simply translate the global identifier to the IP address.

While the term communication or cellular device is referred to throughout the present application, other names can also be used, for example, computing or mobile apparatus. The system, as described herein, can also be referred to as a service, network, PBX network, etc. Known to those skilled in the relevant art, other internal identifiers can also be used and these are not limited to PBX extensions. Below, an environment for the telecommunication system will be first described. Call handling processes for both originating as well as incoming calls are described thereafter.

Figure 1:
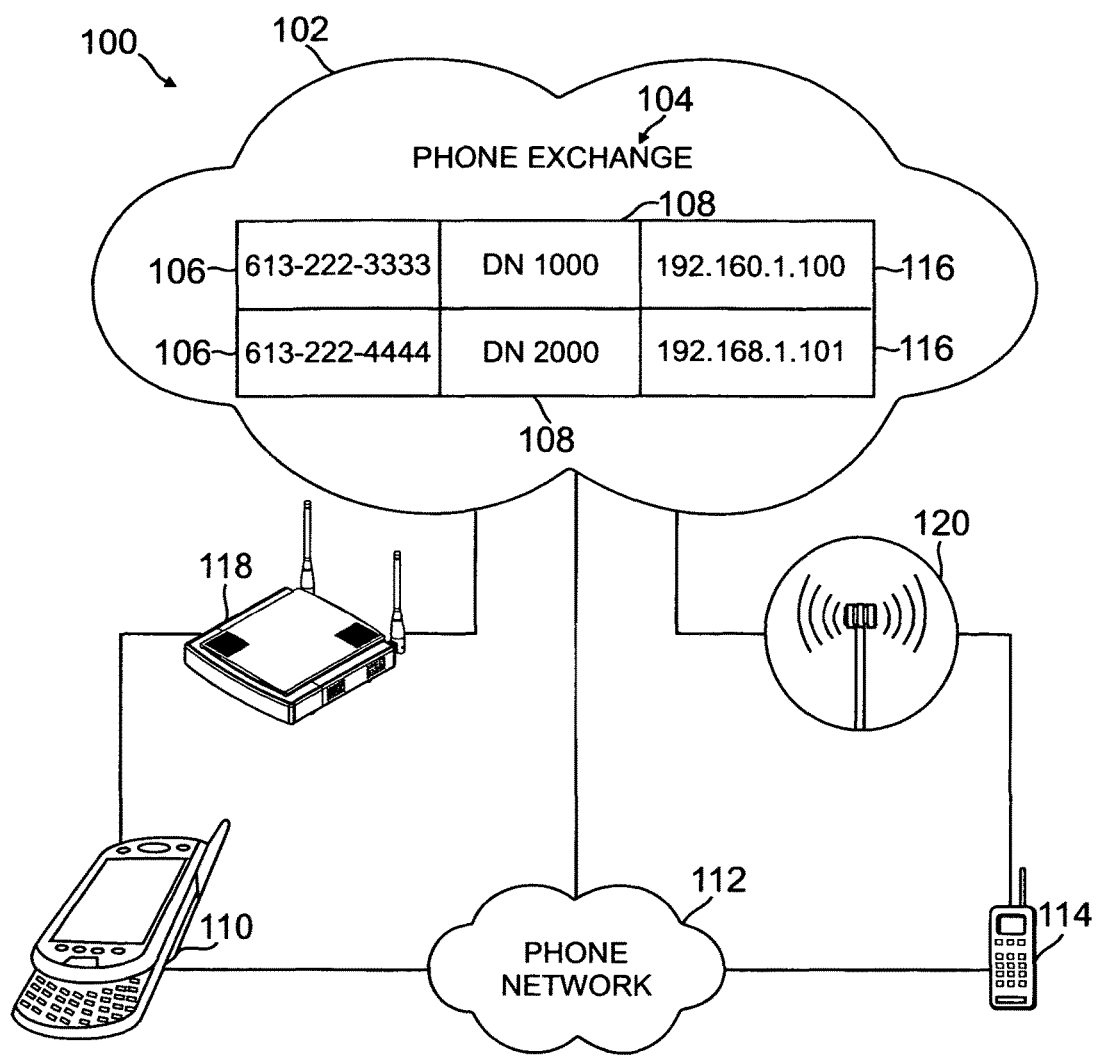
FIG. 1 depicts an exemplary environment for a telecommunication system that handles both call origination and incoming calls within a wireless network in accordance with one aspect of the present application.

Turning to FIG. 1, an exemplary environment 100 for a telecommunication system 102 that handles both call origination and incoming calls within a wireless network 102 is provided in accordance with one aspect of the present application. As will be shown, a communication device 110 can dial to or receive calls from another communication device 114 through the system 102 with the communications routed over WiFi and not the phone network 112 to avoid charges. This has the implication that both devices 110 and 114 are in the scope of the phone exchange 104, such as a PBX. If the dialed number is not within scope of the phone exchange 104, calls can be routed via the PBX public switched telephone network breakout, or directly via the phone network 112, such as a wireless carrier network. Advantageously, this system can allow phone numbers 106 to be translated to PBX extensions 108 so that no internal knowledge of the PBX dialing plan is required to use VoIP clients to bypass wireless tolls. Furthermore, call restrictions and privileges enforced against PBX extensions 108 automatically become enforced against phone numbers 106 since these numbers are in fact reflections of internal PBX numbers. Advantages of using IP addresses 116 allow phone users to dial each other directly, and connect over WiFi, instead of the phone network 112. The phone number 106 to IP address 116 resolution enables WiFi clients to communicate point-to-point, off the network 112, without incurring toll costs.

In a multi-node PBX environment 100, the internal DN 108 can be used to route the call through the PBX network 102, and at the egress point, where the call leaves the PBX 104 to reach the VoIP client, the IP address 116 can be used. This allows the entire call routing structure of the PBX network 102 to be reused, while using an IP address 116 for the last exchange. For example, a VoIP client in the United States of America can call a VoIP client in China as long as the PBX network 102 exists between the two destinations that allow the internal DNs 108 to call each other. The two cell phones 110 and 114 can then call each other using WiFi over VoIP clients simply by dialing the global identifier 106 of the cell phone, which then translates to internal DNs 108, routes the call, and then finally presents it to the destination VoIP client using its IP address 116.

Telecommunication system 102, in embodiments of the present application, routes or forwards calls using internal extensions 108. While a single phone exchange 104 is provided within the system 102, those skilled in the relevant art will appreciate that multiple switches connected around the world or within an area can be used allowing calls to be routed using the internal extension 108 to the egress point of the phone exchange 104. At the egress point, the internal extension 108 can be mapped to an IP address 116 of the global number 106, and the call can be presented to the VoIP client on communication device 110 or 114 depending on who is calling. A call processor on the phone exchange 104 can map the global identifier 106, such as the shown phone number, by translating it to an associated IP address 116. Generally described, and further elaborated below, on ingress, the global identifiers 106 are used to translate to a PBX extension 108 to route the call through the network. The PBX network 102 can be fixed wired or wireless. On egress, the PBX extension 108 can be tied to the IP address 116 of the VoIP client and allow the call to be completed. Those skilled in the relevant art will appreciate that the lookup table can use multiple keys, such as a DN 108 or global identifier 106, to access an IP address 116.

Communication device 110 can communicate with a wireless router 118, while communication device 114 can communicate with a cell network 120. Typically, however, these can be interchanged or replaced with similar components for communication with the system 102. In one embodiment, the system 100 can use a PBX while in other configurations, the system 100 uses other types of phone exchanges 104 or switching circuitry known to those skilled in the relevant art. Multiple switches can exist with the system 102 and is not limited to a single PBX.

Continuing with FIG. 1, within the phone exchange 104 is a lookup table that can include associations between global identifiers 106 and internal identifiers 108. The global identifiers 106 can take the form of a phone number having a total of ten digits, which can also be referred to as a cellular number. The internal identifiers 108 can be PBX extensions. The PBX extensions 108 can be used by the phone exchange 104 and hidden from the users. In one embodiment, the internal identifiers 108 can be used only by those devices that are associated with the network 102. Those skilled in the relevant art will appreciate that both global identifiers 106 and internal identifiers 108 can come in a variety of forms and are not limited to those described herein.

As shown in FIG. 1, the global identifier 106 613-222-3333 can be associated with the internal identifier 108 DN 1000 and the global identifier 106 613-222-4444 corresponds to internal identifier 108 DN 2000. Standard PBX extension programming capabilities can be used to define attributes such as call behavior, restrictions, etc. When a VoIP client deregisters, or the entry expires, the mapping can be removed.

Associated with each global identifier 106 and internal identifier 108 can be an IP address 116 for the VoIP client running atop the communication devices 110 and 114. Continuing with the illustration shown in FIG. 1, the global identifier 106 613-222-3333 and internal identifier 108 DN 1000 correspond to IP address 116 192.160.1.100 and global identifier 106 613-222-4444 and internal identifier 108 DN 2000 are associated with IP address 116 192.160.1.101.

The phone exchange 104 can operate with a wireless network to facilitate interactions between the communication devices 110 and 114. The communication devices 110 and 114 can operate with the telecommunication system 102 using logical connections. These logical connections can be achieved by communication input/output ports on the communication devices 110 and 114. Memory on the communication devices 110 and 114 can include one or more device managers for interacting with the input/output ports. Within the memory, the VoIP client can be run on the communication devices 110 and 114.

The VoIP clients can be compatible with the phone exchange 104, and upon startup, register their cellular number with the phone exchange 104. The phone exchange 104 can attach an available PBX extension 108 to the cellular number 106. Neither user requires knowledge of the PBX extension 108. Generally, a user can dial a desired cellular number from a contact list, and the VoIP client can first try the phone exchange 104, and if unable to route the call, the phone network 112 can be used. The full capabilities including features, restrictions, call routing, call records, etc. of the phone exchange 104 can be applied to the cellular number's internal PBX extension 108 when initiating or receiving calls via the phone exchange 104.

Figure 2:
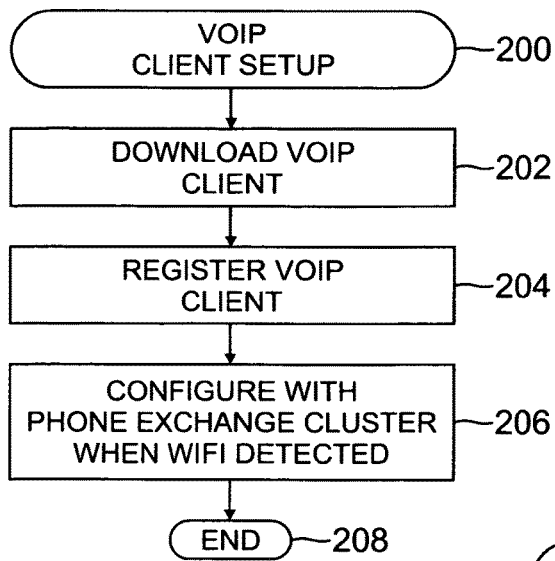
FIG. 2 provides a flow chart showing typical processes for setting up a VoIP client in accordance with one aspect of the present application.

FIG. 2 provides a flow chart showing typical processes for setting up a VoIP client in accordance with one aspect of the present application. At block 200, the processes can begin. At block 202, the communication device 114 can download the VoIP client. The VoIP client can be received from a server or provided within the software configured on the communication device 114. The VoIP client can be used to send and receive SIP messages and to send and receive RTP for the voice path. Typically, this methodology of turning the communication device 114 from a handset into a standard SIP client requires that the mobile handset support, at minimum, high speed IP communications. The communication device 114, at block 204, can register the VoIP client.

At block 206, the VoIP client can register with the phone exchange cluster when WiFi is detected. By setting up the VoIP client, cellular numbers 106 can be translated to PBX extensions 108, such that no internal knowledge of the PBX dialing plan is required to use VoIP clients for bypassing wireless tolls. This can allow phone users to dial each other directly, and connect over WiFi, instead of the phone network 112. The call processor can map the phone number 106 by translating it to an IP address 116. The system 102 can work with voice data packets, e-mail messages, text messages or other communications. The processes can end at block 208.

As part of the VoIP client registration, generally both communication devices 110 and 114 provide their global identifier 106 and their IP address 116, port, and other specific network contact information so that the global identifier 106 can be translated. The intent of the internal identifiers 108 are that they can be preconfigured in a pool, with restrictions, and assigned to global identifier 106 as a VoIP clients register. This typically prevents provisioning of the phone exchange 104 for every VoIP client global identifier.

Figure 3:
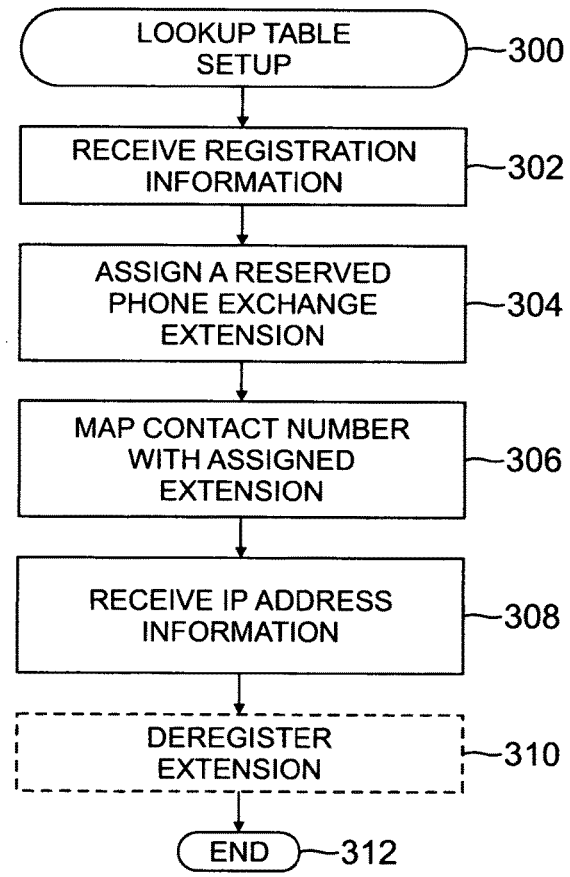
FIG. 3 shows a flow chart providing typical processes for setting up a network service in accordance with one aspect of the present application.

Now referring to FIG. 3, a flow chart providing typical processes for setting up a lookup table in accordance with one aspect of the present application is provided. The lookup table can be located within the phone exchange 104 as previously shown. Alternatively, the lookup table can be located outside of the phone exchange 104, for example, on a separate server. The processes for setting up the lookup table can begin at block 300.

At block 302, the phone exchange 104 can receive registration information from the communication device 114. In one embodiment, the registration information can be used to prevent hostile devices from associating themselves with the system 100. At block 304, the phone exchange 104 can reserve an extension 108 for the communication device 114. In one embodiment, the extension 108 can include four digits. Alternatively, the extension 108 can be statically associated or pre-configured. The extension 108 can also be randomly selected from a pool.

The phone exchange 104 can map the phone number of the communication device 114 with the assigned extension 108 at block 306. As shown in FIG. 1, the phone exchange 104 can maintain a lookup table that provides global identifiers 106 and maps them to internal identifiers 108. The IP address 116, port, and other specific network contact information can be received at block 308, so that the global identifier 106 can be translated. At block 310, optionally, the extension number 108 can be deregistered when required. The processes can end at block 312. Uses for these mappings in the lookup table will be described below.

Figure 4:
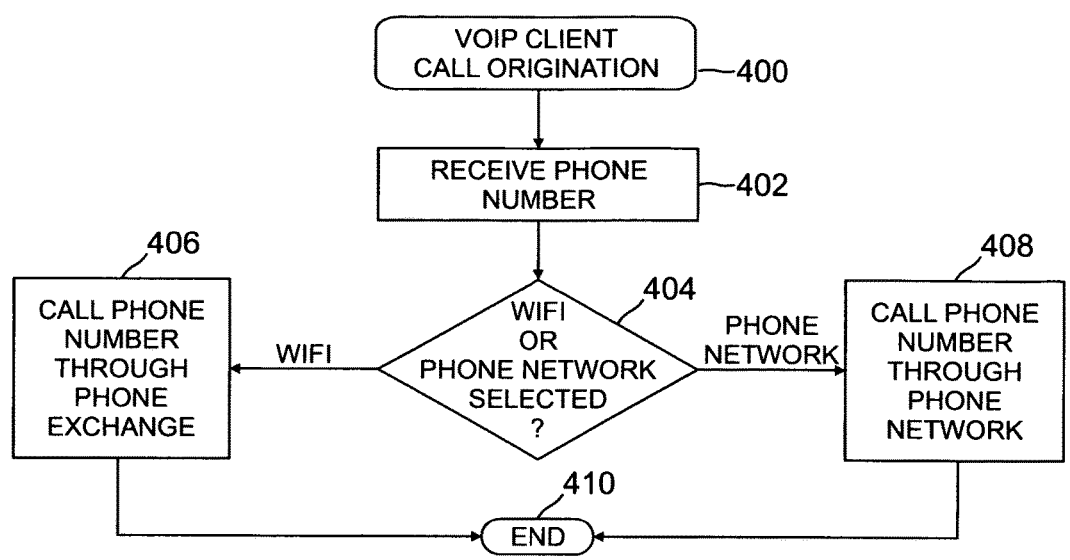
FIG. 4 illustrates processes for call origination by a VoIP client in accordance with one aspect of the present application.

Referring now to FIG. 4, processes for call origination on a VoIP client in accordance with one aspect of the present application are provided. These processes depict one embodiment and should not be construed as limiting the scope of the present application. The processes for the VoIP client can begin at block 400. At block 402, the VoIP client can receive a global identifier 106, such as a phone number from a user. The phone number 106 can be received through a keypad on the communication client 110 or can be pre-programmed within a contact list. Those skilled in the relevant art will appreciate that communication device 114 can also originate the call.

At decision block 404, the communication device 110 can determine whether a WiFi or phone network 112 has been selected for outgoing calls. In this embodiment, the user can optionally select either, or it can be automatically detected if a WiFi network is available. Default options can be provided to the user of the communication device 110, for example, the phone network 112 can be preferred to route communication requests. When WiFi has been selected, the phone number 106 is called through the phone exchange 104 at block 406. On call origination, if the client application is bound to the server, it intercepts dialing attempts and/or text message attempts and directs the call to the phone exchange 104. Known to those skilled in the relevant art, other forms of communications can be implemented. In one embodiment, when the application on the phone 110 detects an error response, the phone 110 can choose to direct the call to the phone network 112 at block 408. For example, this can occur if the phone exchange 104 does not allow long distance calls.

As will be shown below, the phone exchange 104 can insert the cellular number 106 and name as the originator of the call, replacing the VoIP client information. This allows control of such information at the phone exchange 104 level. The processes for the phone exchange 104 and routing the call will further be described below in FIG. 5. Alternatively, when the phone network 112 is selected to handle communications, the communication device 110 calls the phone number 106 through the phone network 112 at block 408. The processes for the VoIP client can end at block 410.

Figure 5:
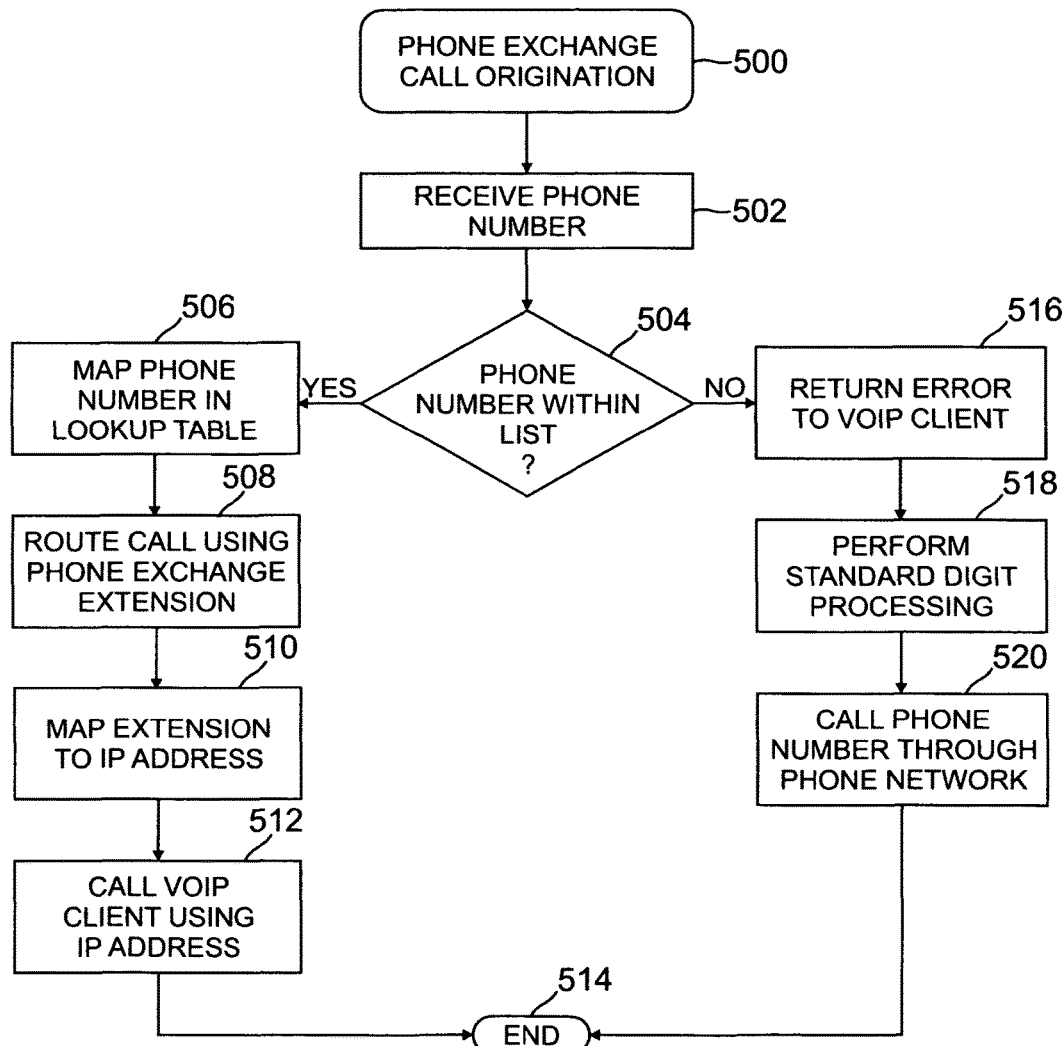
FIG. 5 depicts exemplary processes for call origination on a phone exchange in accordance with one aspect of the present application.

Turning to FIG. 5, exemplary processes for call origination on a phone exchange 104 in accordance with one aspect of the present application are provided. While a single phone exchange 104 is provided, those skilled in the relevant art will appreciate that numerous switches can be used within the system 102. The processes for the phone exchange 104 can begin at block 500. At block 502, the phone exchange 104 can receive the phone number being dialed i.e. global identifier 106. The phone exchange 104 can originate the call using its caller identification such as a name and number associated with the communication device 110, or if applicable, the work number of the phone exchange 104 or the home number of the user can be substituted.

At decision block 504, the phone exchange 104 can determine whether the phone number is within the lookup list. The lookup list can maintain a one-to-one correspondence, for example, one global identifier 106 to one internal identifier 108. Other configurations known to those skilled in the relevant art can be maintained as well. When the phone number 106 is within the list, at block 506, the phone exchange 104 can map the global identifier 106 in the lookup table to a PBX extension 108. From the illustration provided above, the global identifier 106 613-222-4444 would be mapped to internal identifier 108 DN 2000 and global identifier 106 613-222-3333 would be associated with internal identifier 108 DN 1000.

At block 508, the phone exchange 104 can route the call using the phone exchange extension 108. For example, when communication device 110 calls device 114 using global identifier 106 613-222-4444 to reach device 114, the phone exchange 104 uses extension 108 DN 2000 without device 110 knowing about it. The extension 108 is then mapped to an IP address 116 at block 510 for WiFi calling. A call by the VoIP client is then made using the IP address 116 at block 512. The processes can end at block 514.

When the phone number 106 is not within the list, however, the phone exchange 104 can choose to route the call directly to the global identifier 106 using the resources of the phone exchange 104, or return a routing error to the VoIP client originating the call at block 516. In one embodiment, warnings to the user can be provided indicating that tolls will be incurred. At block 518, standard digit processing can be performed on the phone number 106 that was received. The phone exchange 104 can call the phone number 106 through the phone network 112 at block 520. Generally, when the phone number 106 cannot be contacted through the phone exchange 104, the user of the communication device 110 can assume that the call is to be made over the phone network 112. The application on the phone 110 can receive an error for the VoIP call and can then choose to automatically use the phone network 112. The processes can end at block 514.

The phone exchange 104, in one embodiment, can use its resources to route the call. For example, the VoIP client can make the call with the phone exchange 104 routing the call over a primary rate interface or some other cheaper medium, rather than providing an error to the VoIP client on device 110. If the PBX extension 108 representing the VoIP client is not permitted to make "external" calls, long distance calls, etc, the phone exchange 104 can return an error to the VoIP client running on the device 110, and the VoIP client application can then choose via configuration to send the call over the carrier network, warn the user, etc.

In one exemplary application using PBX extensions 108, several employees can download and install the VoIP client on their communication devices allowing them to stay in touch with their co-workers. Worker A can come into work and register their device with the global identifier 106 613-222-3333. The lookup table can assign a PBX extension 108 DN 1000 to the VoIP client. When Worker B arrives, their phone likewise registers their global identifier 106 613-222-4444 and is assigned PBX extension 108 DN 2000.

When Worker A calls Worker B, the phone exchange 104 can receive the call request because Worker A's VoIP client is active. The lookup table can be consulted, and it can be determined that Worker B is also active on the WiFi network. The phone exchange 104 then makes a call from PBX extension 108 DN 1000 to PBX extension 108 DN 2000 where an associated IP addresses 116 can be used to connect the call over WiFi, namely 192.168.1.101. As shown, the phone numbers themselves only have meaning as an index into the lookup table in the illustration. This can also work for internal PBX extensions 108 calling an employee's cellular device. If the cellular number 106 appears in the lookup table, the call can be made to the PBX extension 108 associated with this device, otherwise it is made over the phone network 112, such as a PSTN. This can allow a single number association between a user's cell phone 106 and work extension 108 whereby the phone number is dialed, regardless of whether the destination device is on the WiFi network or abroad. Each of the parties can use their existing contacts, for example global numbers, but the VoIP client can send calls, texts, etc. over the internal WiFi network. Typically, the PBX numbers 108 associated with the global identifiers 106 are not directly dialed.

For calls incoming to a VoIP client on the communication device 110 registered with the phone exchange 104, typically the carrier network will route the call to the phone 110 bypassing the phone exchange 104 and costing minutes. When the VoIP application is active and registered with the phone exchange 104, however, a call coming into device 110 will not ring. As described in more details below, the VoIP client can forward the call to the phone exchange 104, which has the carrier forwarding the call to the PBX number 108. The phone exchange 104 can then receive the forwarded call, and be able to use the forwarding party information in that call, e.g. the cell number 106 that has the VoIP client active, to locate the internal DN 108 and IP address 116 to route the call. When forwarding by the communication device 110 incurs toll costs, in one embodiment, the "Force to PBX" feature can be used where the VoIP client is intended to work on a specific WiFi network, for example, in a corporate network.

Figure 6:
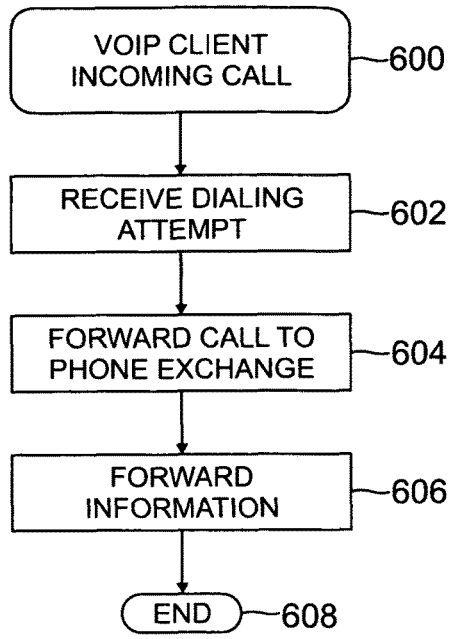
FIG. 6 provides a flow chart showing typical processes for handling incoming calls on a VoIP client in accordance with one aspect of the present application.

FIG. 6 provides a flow chart showing typical processes for handling incoming calls on a VoIP client in accordance with one aspect of the present application. At block 600, the VoIP client processes for handling incoming calls can begin. At block 602, the VoIP client on communication device 110 can receive a dialing attempt with the incoming call received over the carrier network 112. Typically, the call from device 114 is made by entering a global identifier 106 613-222-3333 of communication device 110. In turn, the VoIP client on communication device 110 can forward the call to the phone exchange 104 on the system 102 at block 604, which has the carrier forwarding the call to the PBX number 108. Information about the communication device 110 can be forwarded to the phone exchange 104 at block 606, where, in one embodiment, the cell number 106 that has the VoIP client active can be used to locate the internal DN 108 and IP address 116 to route the call. In the illustrative embodiment, phone number 106 613-222-3333 of communication device 110 can be provided to the phone exchange 104. Other information from communication device 110 including IP address 116, port, transport, etc. can be provided. In one embodiment, the device 110 does not need to provide any additional information, as long as the originally dialed number of device 110 is presented to the PBX 104. The processes can end at block 608.

Figure 7:
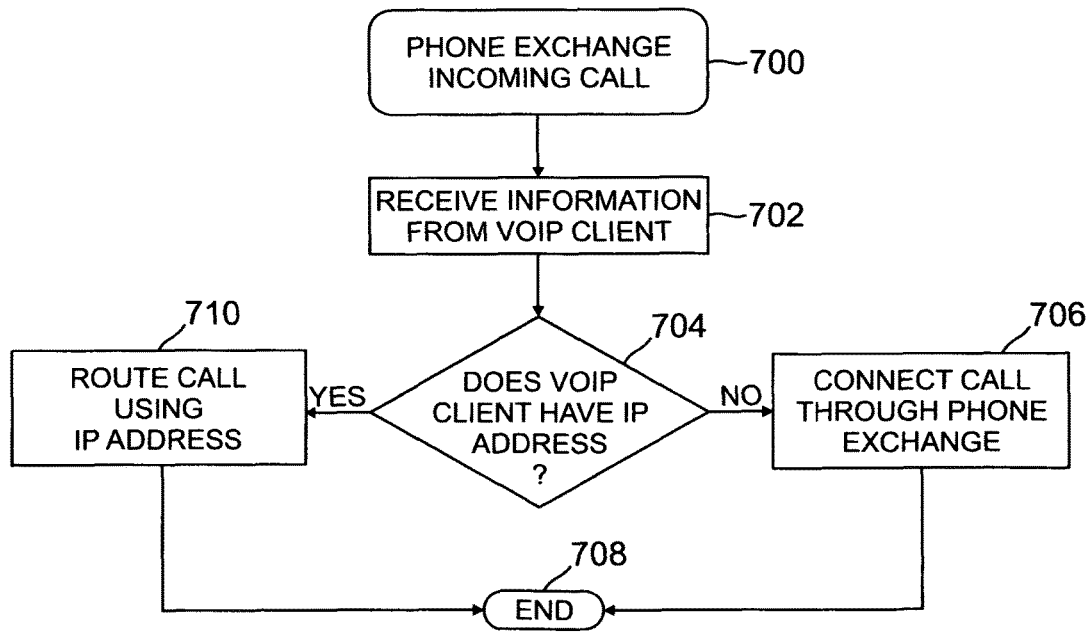
FIG. 7 illustrates processes for handling incoming calls on a phone exchange in accordance with one aspect of the present application.

Turning to FIG. 7, illustrative processes for handling incoming calls on a phone exchange 104 in accordance with one aspect of the present application are provided. The phone exchange 104 can provide cell number 106 to IP address 116 mappings. Since the key index is the phone number 106 itself, which is globally unique, the phone exchange 104 can host multiple networks without fear of overlap. In addition to the IP address 116, the phone exchange 104 can store, port, and transport other information required to connect the communication device 110. If the service is running in conjunction with a PBX 104, the DN 108 associated with the VoIP client can be stored as well. The processes can begin at block 700.

At block 702, the phone exchange 104 can receive information from the VoIP client on communication device 110. The information can include the global identifier 106 of communication device 110, for example, global identifier 106 613-222-3333. In this embodiment, if the forwarding message from the carrier contains the originally dialed number, i.e. 613-222-3333, this is sufficient to route the call as the system 102 has the mobile number stored. When the carrier does not support passing the require forwarding information, the client application on communication device 110 can notify the system 102 of the mobile number and original caller identification prior to forwarding the call such that the system 102 has the information ready when the call arrives. The method selected depends on the level of support in the carrier network for forwarding information.

The global identifier 106 can then be used to map to an IP address 116. The forwarded information can also contain the VoIP client DN/identification. This can allow the phone exchange 104 to reach out over WiFi to the correct VoIP client. At decision block 704, the phone exchange 104 determines whether the VoIP client has an IP address 116 based on the information received. When there is no IP address 116 for communication device 110, the phone exchange 104 can connect the call from communication device 114 through the phone network 112 at block 706. Generally, the VoIP client would only forward the incoming carrier call to the phone exchange 104 if the VoIP client was registered in the first place. Otherwise the call can be made over WiFi by routing the call using the IP address 116 192.160.1.100 at block 710. The processes can end at block 708. Through this, the client/server application combination can be used to route calls incoming to a cellular device back to a phone exchange 104 or even the called parties' home phone, and then the server component residing at that location can route the call out over WiFi or other toll avoiding framework to the client on the communication device 110.

Advantageously, the system 102 places the power to do call routing into the hands of an end user, not the carrier, and does not require fixed/static routing rules. In one embodiment, once on the system 102, calls can be billed, advertisements can be offered and other data gathering/mining such as location can be accessed. Furthermore, when using SMS, MMS, etc, tolls can be avoided. This modification does not require both the originating and destination device to be VoIP and does not require both the source and destination to be running the client application. It can be set up on a home phone line so that calls to a mobile get forwarded to the home phone, then out to the internet connection to the WiFi hotspot, and onto the VoIP client. This can be implemented, for example, in hotels to avoid tolls to and from a cell when in a WiFi zone, while still dialing a cell phone number.

For purposes of illustration, the above described system 102 can be used on a cruise ship where thousands of people board and leave regularly. In this illustration, typically the cell numbers 106 of the people on the ship are not known. Many of the patrons can be associated within their own small groups. While their cell phones are programmed with the contacts of each other, as this is their primary means of regular daily communications, cell phone usage on the ship is costly and can be impacted by the signal.

Through the use of the system 102, the patrons can download the VoIP application and instantly be able to communicate with each other using their existing numbers 106. The system 102 can provide the use of global numbers 106 across the phone exchange 104 with no configuration overhead to map to PBX extensions 108, room numbers, etc. To further illustrate the incoming call features described in FIGS. 6 and 7, generally, when a call is made to a party on the ship, the phone will ring. If answered by the party, they will be charged. In system 102, the VoIP client can forward the incoming cellular call to the main cruise ship phone exchange 104, which in turn routes the call using the original dialed cell phone number 106 using the cruise ships PBX network to reach the phone's VoIP client.

While the calling party pays long distance, the call can be free to the party on the ship and does not use any cellular minutes. While some cellular providers charge for forwarding, some do not, and still others offer bulk forwarding minutes as part of basic packages. Other locations having WiFi can use this feature, for example, airports, coffee shops, etc. In one embodiment, when a user is in a WiFi hotspot, their cell phone can automatically forward cell calls to their home phone, which then bridges the call over their home IP connection out over the internet to their VoIP client. Generally, this requires that the home network contain a small phone exchange 104 to map the original cell call from the home phone to the VoIP client IP address 116. Such a phone exchange 104 is an example where no internal PBX identifier 108 is required i.e. a direct cell 106 to IP address 116 mapping is used.

In accordance with one aspect of the present application, a method for establishing communication with a device having a global identifier is provided. The method can include receiving a communication request for a device along with a global identifier corresponding to the device. In addition, the method can include associating the global identifier with an internal identifier and IP address of the device. The method can also include routing the communication request using the internal identifier and connecting the communication request with the device using the IP address.

In one embodiment, the method can include registering the device by attaching the global identifier with the internal identifier and the IP address on a phone exchange. In one embodiment, the communication request can be received from a calling device. In one embodiment, routing the communication request using the internal identifier can include directing the communication request to an egress point associated with the device.

In one embodiment, associating the global identifier with the internal identifier and the IP address can include using a lookup table on a phone exchange. In one embodiment, the communication request can be received from the device. In one embodiment, the device can forward the global identifier. In one embodiment, associating the global identifier with the internal identifier and the IP address can include using a lookup table on a phone exchange.

In accordance with another aspect of the present application, a phone is provided. The phone can include at least one processor and a memory operatively coupled to the processor, the memory storing program instructions that when executed by the processor, causes the processor to perform processes. The processes can include receiving receive a communication request over a phone network. In addition, the processes can include forwarding phone information to a network service, wherein the network service determines whether the phone is associated with an IP address using the phone information. The processes can include connecting the communication request with the phone through the IP address using a wireless network depending on the determination.

In one embodiment, the memory storing program instructions, when executed by the processor, causes the processor to connect the communication request with the phone over the phone network depending on the determination. In one embodiment, the phone network can be a plain old telephone service network. In one embodiment, the memory storing program instructions, when executed by the processor, causes the processor to display an error depending on the determination.

In one embodiment, the phone information can include a global identifier. In one embodiment, the memory storing program instructions, when executed by the processor, causes the processor to configure the phone with the network service. In one embodiment, configuring the phone with the network service can include providing the IP address along with port and contact information. In one embodiment, wherein connecting the communication request with the phone through the IP address can include a peer-to-peer connection.

In accordance with yet another aspect of the present application, a system is provided. The system can include a phone exchange for establishing a connection between a calling device and a called device. The phone exchange can receive a dialed number for the called device from the calling device. The phone exchange can route the connection using an extension of the phone exchange when the dialed number translates to the extension and can establish the connection over a wireless network otherwise the phone exchange can provide the connection through a phone network.

In one embodiment, the phone exchange can include a lookup table for storing associations between the dialed number and phone exchange. In one embodiment, the calling device and called device can be configured with the phone exchange. In one embodiment, the calling device can install a VoIP client and registers with the phone exchange.

The foregoing description is provided to enable any person skilled in the relevant art to practice the various embodiments described herein. Various modifications to these embodiments will be readily apparent to those skilled in the relevant art, and generic principles defined herein can be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. A method for establishing communication between devices in a telecommunication system, said method comprising:

at a phone exchange of the telecommunication system:

receiving registration information from a VoIP client of a first device, the registration information comprising a global identifier corresponding to the first device and IP address information for the first device;

when WiFi is detected, registering the first device by storing the global identifier corresponding to the first device in association with an internal identifier in the form of a directory number internal to the phone exchange and the IP address information for the first device, the internal identifier being associated with an egress port of the phone exchange;

receiving, at an ingress port of the phone exchange, a communication request sent from a VoIP client of a calling device to establish communication with the first device, wherein the VoIP client of a calling device intercepts a request for communication and directs the request for communication to the phone exchange, said communication request including the global identifier corresponding to said first device;

mapping, on ingress of the communication request, the global identifier corresponding to the first device with the internal identifier;

routing said communication request within the phone exchange to the egress port associated with said internal identifier;

mapping, at the egress port, the internal identifier to the IP address information for the first device;

sending said communication request to the VoIP client of said first device using said IP address information for the first device stored in association with the internal identifier;

responsive to receiving, at the ingress port of the phone exchange, the communication, determining whether the global identifier is registered at the phone exchange;

responsive to determining that the global identifier is registered at phone exchange, routing the communication request within the phone exchange to the egress port associated with the internal identifier; and absent determining that the global identifier is registered at the phone exchange, routing the communication request through a phone network to the global identifier to establish communication with the first device.

2. The method of claim 1, wherein routing comprises directing said communication request from the ingress port to the egress point associated with said device internal identifier.

3. The method of claim 1, wherein storing comprises storing said global identifier in association with said internal identifier and said IP address information in a lookup table of a data store at said phone exchange.

4. The method of claim 3, wherein the step of mapping, on ingress of the communication request, the global identifier corresponding to the first device with the internal identifier, comprises mapping the global identifier to the internal identifier stored in the lookup table.

5. The method of claim 4, wherein mapping, at the egress port, the internal identifier to the IP address information for the first device comprises mapping the internal identifier to the IP address information stored in the lookup table.

6. The method of claim 1, further comprising:

absent responsive to determining that global identifier is registered at the phone exchange, sending, to the VoIP client of the first device, a routing error message.

7. A system comprising:
a phone exchange for establishing communication between a calling device and a first device, the phone exchange being configured:
- to receive registration information from a VoIP client of the first device, the registration information comprising a global identifier corresponding to the first device and the IP address information for the first device;
- when WiFi is detected, to register the first device by storing the global identifier corresponding to the first device in association with an internal identifier in the form of a directory number internal to the phone exchange and the IP address information for the first device, the internal identifier being associated with an egress port of the phone exchange;
- to receive, at an ingress port, a communication request sent from a VoIP client of the calling device to establish communication with the first device, wherein the VoIP client of a calling device intercepts a request for communication and directs the request for communication to the phone exchange, said communication request including said global identifier corresponding to the first device;
- to map, on ingress of the communication request, the global identifier corresponding to the first device with the internal identifier;
- to route the communication request within the phone exchange to an egress port associated with the internal identifier;
- to map, at the egress port, the internal identifier to the IP address information for the first device;
- to send the communication request to the VoIP client of the first device using the IP address information for the first device stored in association with the internal identifier;
- responsive to receiving, at the ingress port of the phone exchange, the communication request, to determine whether the global identifier is registered at the phone exchange;
- responsive to determining that the global identifier is registered at the phone exchange, to route the communication request within the phone exchange to the internal identifier associated with the egress port; and
- absent determining that the global identifier is present registered at the phone exchange, to route the communication request through a phone network to the global identifier to establish communication with the first device.

8. The system of claim 7, wherein the phone exchange is further configured to store the global identifier in association with the internal identifier and the IP address information in a lookup table of a data store at the phone exchange.

9. The system of claim 8, wherein the phone exchange is further configured, to map the global identifier to the internal identifier stored in the lookup table.

10. The system of claim 9, wherein the phone exchange is further configured to map the internal identifier to the IP address information stored in the lookup table.

11. The system of claim 7, wherein the phone exchange is further configured to:
- absent responsive to determining that global identifier is registered at the phone exchange, sending, to the VoIP client of the first device, a routing error message.

* * * * *